May 14, 1968 D. HEUSSER ETAL 3,383,097
HEATING OVEN FOR PLATE CHROMATOGRAMS
Filed July 6, 1966
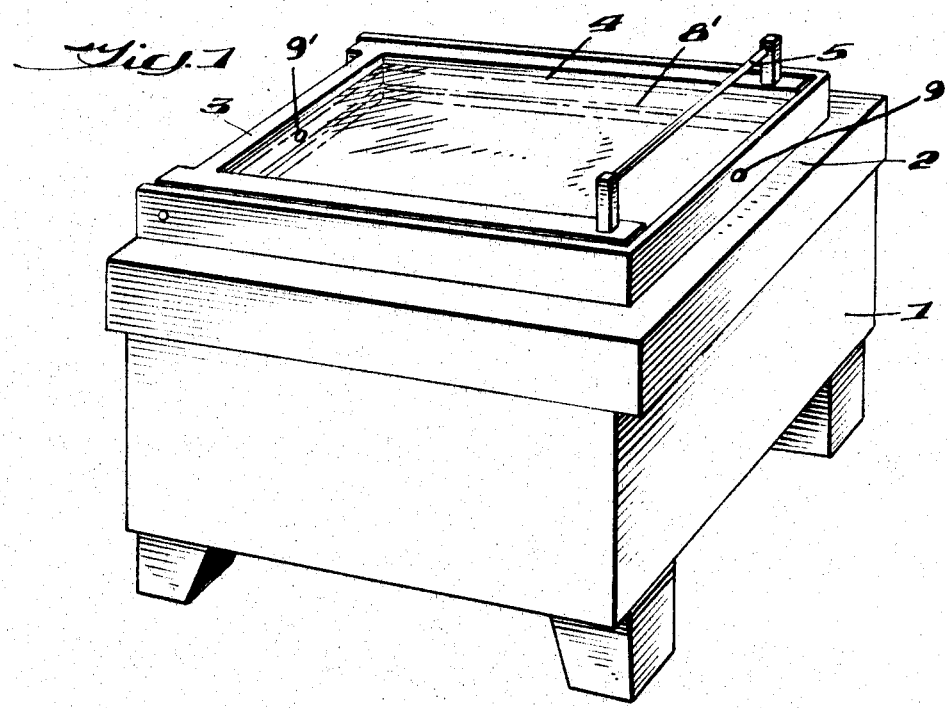
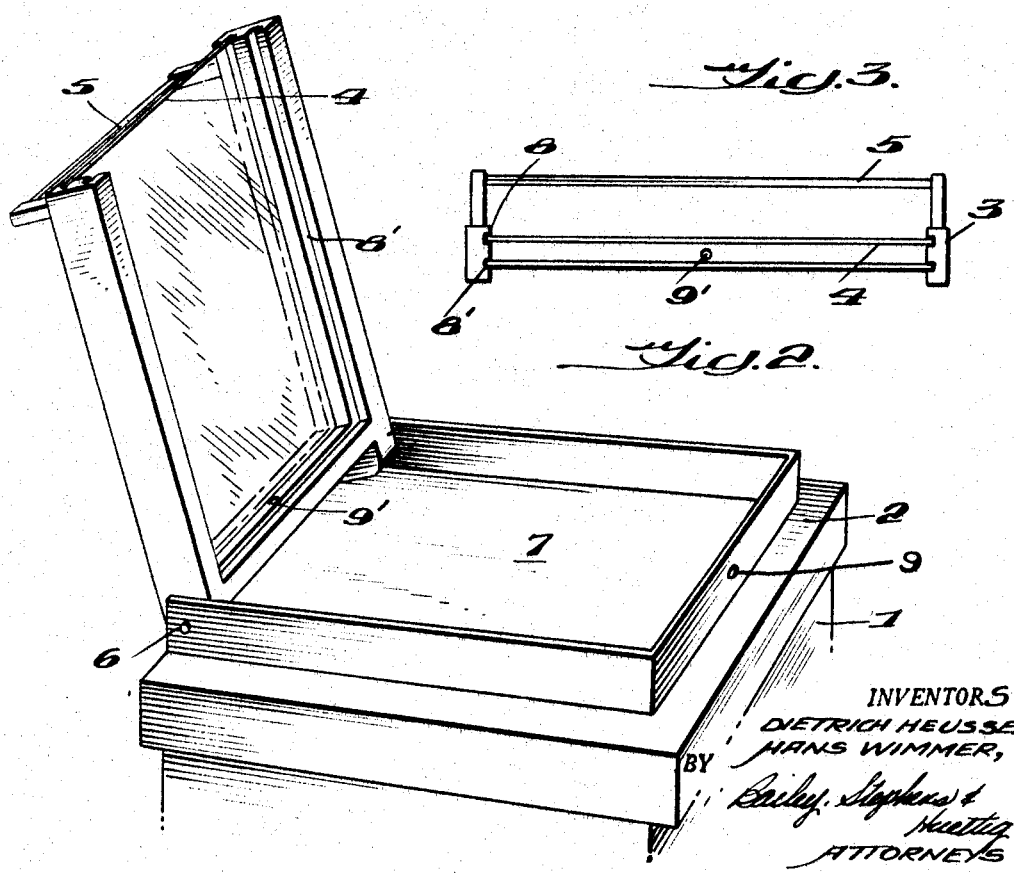
INVENTORS
DIETRICH HEUSSER,
HANS WIMMER,
BY
ATTORNEYS

United States Patent Office 3,383,097
Patented May 14, 1968

3,383,097
HEATING OVEN FOR PLATE CHROMATOGRAMS
Dietrich Heusser and Hans Wimmer, Darmstadt, Germany, assignors to E. Merck Aktiengesellschaft, Darmstadt, Germany
Filed July 6, 1966, Ser. No. 563,202
Claims priority, application Germany, July 10, 1965, M 65,913
9 Claims. (Cl. 263—2)

ABSTRACT OF THE DISCLOSURE

A heating oven for chromatoplates comprising a hot plate, a cover for said hot plate sealing off a relatively flat heating chamber over said hot plate, means within said heating chamber for supporting the chromatoplate to be heated spaced above said hot plate and parallel thereto and means for opening and closing said cover to permit introduction into and withdrawal of the chromatoplates from the heating chamber.

---

The present invention relates to an improved heating oven for the development of layer or plate chromatograms.

As is known, plate chromatograms in many instances must be heated one or more times to develop them. Heating in normal drying cupboards or even in the heating cupboards previously employed in chromatography, however, involved considerable disadvantages, as often substantial temperature gradients occur in such cupboards. As a consequence the plates are not heated uniformly and the substance spots exhibit considerable variations in intensity. If such plates are to serve for a semi-qualitative determination by estimation or a quantitative determination by direct evaluation, it is not possible to obtain usable results. In addition it is not or only partially possible to observe the plates during the heat treatment in the normal drying or heating cupboards. When large surfaced heating cupboards, which are known from paper chromatography, are used for heating plate chromatograms it is also necessary to employ special equipment, which usually is cumbersome to handle, to accommodate the plate chromatograms. A further disadvantage in using normal drying cupboards for heating plate chromatograms is that the greater part of any sprayed on reagent evaporates immediately when the plate is introduced into the hot oven. As a consequence only a small portion of such reagent remains available for color development of the substance to be identified. As a result the chromatograms must be heated for a relatively long time and by the time the spots appear the background of the plates is also already strongly discolored. Such chromatograms are then difficult to evaluate and a quantitative determination is impossible.

According to the invention it was found that these disadvantages can be overcome when a heating oven of special construction is employed for the development of plate chromatograms.

The heating oven according to the invention for plate chromatograms comprises a hot plate provided with a cover closing off the heated space above the hot plate to form a heating chamber, such cover being of very flat form and holds the substrate for the sorption layer parallel to the hot plate situated thereunder.

Expediently, the cover is of such flat form that the height of the heating chamber at most is 10 cm. and preferably 1.5–4 cm. The space between the substrate for the sorption layer supported thereby and the hot plate at most should be 8 cm. and preferably is 1 to 3 cm.

Preferably the area of the hot plate should be approximately that of the chromatoplate which is to be heated thereby. Expediently the top of the cover is formed of a transparent plate. The cover can be provided with a lid of a type which swings back and is provided on its inner side with slots for receiving the chromatoplate and if desired also for the reception of the top transparent cover plate.

If desired the cover may also be provided with one or two closeable vents communicating between the heating chamber and the atmosphere.

The novel heating oven according to the invention renders it possible to heat the whole adsorption layer uniformly and thereby to provide a uniform development of the chromatogram. Premature and excessive evaporation of the spraying agent or respectively the solvent employed for the reagent is hindered by the particularly flat design of the cover provided over the hot plate to define the heating chamber. The quantity of spraying agent required is therefore reduced to a minimum and also the heating time required until the spots appear is shortened considerably. The appearance of the troublesome discolorations of the adsorption layer itself is thereby greatly reduced. A further considerable advantage of the heating oven according to the invention resides in that in the preferred form in which the top of the cover is in the form of a transparent pane, the progress of the development of the chromatogram can be followed easily and be terminated at the moment of optimal effect.

Should, for some special reason, it be desired that the spray reagents employed or their solvents be able to escape from the heating chamber, the cover, as already indicated, can be provided with closeable vents. Normally one of such vents suffices but in some instances it can be appropriate to provide one on each of two opposite lateral sides of the cover, to provide for better ventilation. Ventilation is desirable, for example, if too great an excess of spray reagent, for example, concentrated sulfuric acid, has been used so that disturbing droplets may form on the inside of the top thereof in the absence of provisions for ventilation.

The accompanying drawings illustrate a preferred form of construction of the heating oven according to the invention.

In such drawings:

FIG. 1 shows a perspective view of the heating oven according to the invention;

FIG. 2 shows a perspective view of the cover provided for the hot plate with the lid in open position; and FIG. 3 shows an end view of the lid.

As shown in such drawings the heating oven according to the invention includes a heating plate 1, preferably clad, of normal construction which is provided with a flat cover 2. The top of hinged lid 3 is provided with a transparent plate 4 which renders it possible to obtain an undisturbed view of the development during the heating of the chromatogram plates, with the lid in closed position.

To facilitate easy movement of lid 3 it is provided in the embodiment shown with a handle which preferably is heat insulated.

As shown in FIG. 2, hinged lid 3 carrying transparent top plate 4 is pivotable around axis 6. In the assembled heating oven according to the invention hot plate 1 lies under area 7. Closeable vents 9 and 9' are provided in cover 2.

Grooves 8 and 8' are provided in lid 3 respectively serving to hold transparent plate 4 and the chromatoplate (not shown), which is to be heat treated in the oven.

Any of the usual hot plates with a rectangular, preferably, square, heating surface can be used for the heating oven according to the invention. Expediently the dimensions of the heating plate are so chosen that its surface approximately corresponds to that of the sorption layer to be heated. Naturally it is also possible to employ a very elongated heating plate provided with an equally elongated cover in which several chromatograms can simultaneously be inserted side by side.

It furthermore is expedient to provide the heating plate with an automatic temperature regulator so that the chromatoplates can automatically be heated to a predetermined temperature. For especially accurate determinations, it is advisable, under some circumstances, to provide a thermostat in the heating chamber enclosed by the heating plate 1 and cover 2, thus allowing exact regulation of the heating chamber per se to a particular temperature.

Cover 2 should be tightly sealed with the heating plate in order that it is possible to maintain a constant temperature and also to prevent escape of the solvents of the spray reagents. The cover can be constructed of any desired material which is stable at the temperatures to be used and not attacked by any reagents to which it is subjected. When metals are used consideration should be given that corrosion may occur because of the spray reagents employed and an appropriate selection should be made.

Lid 3 which as in the embodiment shown in the drawings can be swung upwardly about axis 6 should also close tightly with the remaining portion of the cover when in closed position to assure maintenance of a constant temperature within the heating chamber and prevent escape of spray reagent solvents. As soon as completion of the development of the chromatogram is observed through transparent plate 4 the lid 3 can be swung up with the aid of handle 5 which naturally can be of any suitable construction. If the cover 2 and lid 3 are so associated that lid 3 can be opened by swinging 180° around axis 6 so that it may again be horizontally in open position, the adsorption layer can be allowed to cool in this position and it is thus possible to avoid the necessity of touching the hot developed plate chromatogram. It is, of course, not necessary to design the lid of the cover so that it can swing. It also is possible to construct one of the side walls in such a way that it can be opened up to permit insertion and withdrawal of the chromatoplate.

Furthermore, it is not absolutely necessary to provide grooves 8 and 8' for holding the top closure pane 4 and the chromatoplates in the cover assembly. Both the closure pane as well as the chromatoplates can be held in the cover over the hot plate by any other suitable means. It is only of importance that the chromatoplate is held so that its total surface is equidistant from the hot plate, that is, that it is held parallel to the hot plate, so that uniform heating of the adsorption layer is assured. It is possible, for example, to provide supports at the edges of the hot plate to hold the chromatoplates above the surface of the hot plate but parallel thereto. The manner of supporting the chromatoplates in the heating chamber above the hot plate is of particular advantage if chromatoplates of various layer thicknesses are to be heated.

The transparent cover plate of the lid can either be fixed in the lid or can be mounted movably as, for example, in the grooves in the embodiment shown in the drawings. In the latter instance replacement of such cover plate is simplified. The distance between the cover plate and the adsorption layer of the chromatogram is naturally not critical.

The heating oven according to the invention not only can be used for adsorption layers on glass plates but also those on metal or synthetic resin or plastic foils. When supports other than glass plates are employed care should be taken that the supports do not sag. This when necessary may be prevented by incorporating a stiffening net, lattice or other suitable means. The heating oven according to the invention is suitable for thin layer chromatograms as well as for larger chromatograms with thicker adsorption layers such as are usual in preparative layer chromatography. The heating oven according to the invention is, of course, particularly suited for carrying out for a series of examinations in which plates of the same size and layer thickness are used continuously.

We claim:
1. A heating oven for chromatoplates comprising a hot plate, a cover for said hot plate sealing off a relatively flat heating chamber over said hot plate, means within said heating chamber for supporting the chromatoplate to be heated spaced above said hot plate and parallel thereto and means for opening and closing said cover to permit introduction into and withdrawal of the chromatoplates from the heating chamber, the top of the cover over the relatively flat heating chamber being transparent to permit viewing of the chromatoplate while being heated when supported within the heating chamber parallel to and over the hot plate.

2. The heating oven according to claim 1 in which the height of said relatively flat heating chamber at most is 10 cm.

3. The heating oven according to claim 1 in which the height of said relatively flat heating chamber at most is 1.5 to 4 cm.

4. The heating oven according to claim 2 in which the means supporting the chromatoplate within the chamber is such that it supports the chromatoplate to be heated spaced at most 8 cm. above the hot plate.

5. The heating oven according to claim 2 in which the means supporting the chromatoplate within the chamber is such that it supports the chromatoplate to be heated spaced at most 1 to 3 cm. above the hot plate.

6. The heating oven according to claim 1 in which the surface area of the hot plate essentially corresponds to that of the chromatoplate to be heated.

7. The heating oven according to claim 1 in which said cover comprises a lid pivotally mounted to permit opening and closing thereof for insertion and withdrawal of the chromatoplate from the heating chamber, said lid having two opposed lateral side walls the interior of which are provided with grooves to support the chromatoplate within the heating chamber parallelly over the heating plate when such lid is in closed position.

8. The heating oven according to claim 7 in which the top of said lid is a removable transparent plate supported in grooves in the interior of said side walls above and parallel to said grooves for supporting the chromatoplate.

9. The heating oven according to claim 1 in which said cover is provided with at least one closeable vent communicating between the heating chamber and the atmosphere.

References Cited
UNITED STATES PATENTS

| | | | |
|---|---|---|---|
| 2,634,359 | 4/1953 | Terry | 219—521 |
| 2,794,104 | 5/1957 | Nathan | 219—521 X |

FREDERICK L. MATTESON, JR., *Primary Examiner.*

JOHN J. CAMBY, *Examiner.*